United States Patent [19]

Sherman et al.

[11] Patent Number: 5,455,569
[45] Date of Patent: Oct. 3, 1995

[54] LINK LAYERED COMMUNICATIONS NETWORK AND METHOD

[75] Inventors: Michael J. Sherman; Timothy S. Tait, both of Lexington, Mass.

[73] Assignee: AES Corporation, Peabody, Mass.

[21] Appl. No.: 318,984

[22] Filed: Oct. 6, 1994

Related U.S. Application Data

[63] Continuation of Ser. No. 856,254, Mar. 25, 1992, abandoned.

[51] Int. Cl.$^6$ ................ H04B 7/204; H04Q 7/20
[52] U.S. Cl. ................ 340/825.02; 340/825.52; 370/92; 455/53.1
[58] Field of Search ........ 370/60.1, 92, 94.3, 370/95.1, 95.3; 455/18, 17, 53.1, 56.1, 54.1; 340/825.02, 825.52, 826, 825.54, 825.44

[56] References Cited

U.S. PATENT DOCUMENTS

| | | | |
|---|---|---|---|
| 3,939,417 | 2/1976 | Cannalte et al. | 455/53.1 |
| 4,689,786 | 8/1987 | Sidhu et al. | 370/92 |
| 4,718,109 | 1/1988 | Breeden et al. | 340/825.44 |
| 4,809,362 | 2/1989 | Claus et al. | 340/825.02 |
| 5,005,014 | 4/1991 | Jasinski | 340/825.54 |
| 5,007,052 | 4/1991 | Flammer | 370/94.3 |
| 5,111,198 | 5/1992 | Kuszmaul | 340/825.52 |
| 5,129,096 | 7/1992 | Burns | 455/54.1 |
| 5,179,554 | 1/1993 | Lomicka et al. | 370/92 |
| 5,223,968 | 6/1993 | Stringer et al. | 370/60.1 |
| 5,293,638 | 3/1994 | Sasuta et al. | 455/17 |

FOREIGN PATENT DOCUMENTS

2016486  11/1990  Canada.
401974  12/1990  European Pat. Off..

Primary Examiner—Donald J. Yusko
Assistant Examiner—Mark H. Rinehart
Attorney, Agent, or Firm—Richard J. Birch

[57] ABSTRACT

A wireless, dynamically reconfigurable link layered communications network and method are disclosed. A destination transceiver such as, a central transceiver, has a unique, permanent identification with a predetermined numerical link layer level n. A plurality of remote transceivers each having a unique, permanent identification and a variable, stored numerical link layer x where x> n and x and n are integers and x-n-1 represents the number of remote transceivers through which a communication must pass to reach the destination transceiver. The variable, stored numerical link layer level of each remote transceiver is dependent upon the dynamic condition of the network at the time of message transmission from or through the particular remote transceiver.

20 Claims, 6 Drawing Sheets

LINK LAYERED COMMUNICATIONS NETWORK AND METHOD

This is a continuation of application Ser. No. 07/856,254 filed on Mar. 25, 1992, now abandoned.

BACKGROUND OF THE INVENTION

The present invention relates to communication networks in general, and more particularly, to a wireless, dynamically reconfigurable link layered communication network and method.

Two-way wireless communication networks are well-known in the art. The networks are employed in a variety of applications including cellular telephone networks, packet switching networks, central alarm station reporting systems and more recently "wireless" data transmissions between personal computers and peripheral devices and between client and server computers.

It is a general object of the present invention to provide a link layered two-way communication network and method.

It is a specific object of the invention to provide a dynamically reconfigurable link layered communications network.

It is still another object of the present invention to utilize a plurality of remote transceivers each having distributed intelligence to accommodate for changes in the network and the network environment.

It is a feature of the invention that the link layered communications network can be constructed with existing telecommunications equipment.

It is another feature of the invention that the communications network finds particular application in the field of security systems, such as, central alarm reporting systems.

BRIEF DESCRIPTION OF THE INVENTION

The present invention is a "wireless" i.e., non-hard wired, dynamically reconfigurable link layered communications network and method. The network comprises a destination transceiver such as, a central transceiver having a unique, permanent identification with a predetermined numerical link layer level n and a plurality of remote transceivers each having a unique, permanent identification and a variable stored numerical link layer x. The numerical link layer x is greater than the numerical link layer level n of the destination or central transceiver and both x and n are integers. The number of remote transceivers through which a communication must pass to reach the destination transceiver is determined by x−n−1. The variable, stored numerical link layer level of each remote transceiver is dependent upon the dynamic condition of the network at the time of message transmission from or through the particular remote transceiver.

BRIEF DESCRIPTION OF THE DRAWINGS

The objects and features of the invention will best be understood from a detailed description of the invention as shown in the accompanying drawings, in which.

DETAILED DESCRIPTION OF THE INVENTION

Figure 1:
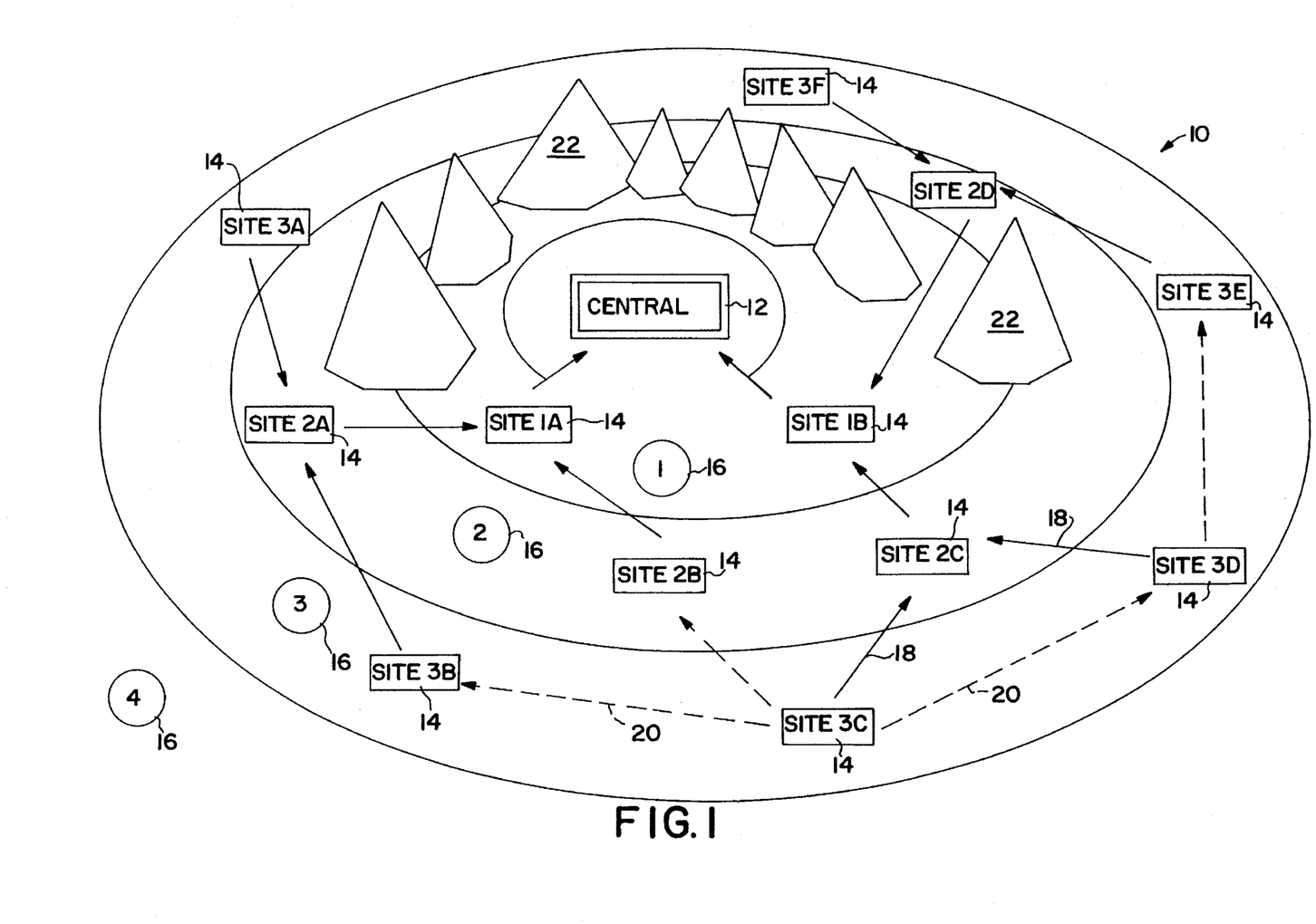
FIG. 1 is a diagrammatic perspective view of a link layered communication network showing a central transceiver, remote transceivers located at varying link layer levels and simplified representations of terrain.

Turning now to the drawings, and particularly to FIG. 1 thereof, there is shown diagrammatically and in perspective view a wireless, dynamically reconfigurable link layer communication network indicated generally by the reference numeral 10. The term "wireless" is used herein to cover all non-wired communications systems and, as such, includes radio, microwave, sonar and light communication systems.

The link layered communication network 10 comprises a destination transceiver such as a central transceiver 12 and a plurality of remote transceivers 14. The remote transceivers 14 are assigned to various link layer levels 16 as determined by the number of transmissions that are necessary to communicate between a particular remote transceiver 14 and the central transceiver 12. As shown in FIG. 1, remote transceivers 14 identified as sites 1A and 1B each can transmit directly to the central transceiver 12 and, therefore, are assigned a link layer level of 1. In a similar fashion, the remote transceivers identified sites 2A, 2B, 2C and 2D are assigned a link layer level of 2 because each of those sites must transmit through one of the transceivers in link layer level 1 i.e., either transceiver at site 1A or at site 1B. The same analysis applies with respect to the remote transceivers located in link layer level 3 at sites 3A through 3F.

Referring to transceiver 14 located at site 3A in link layer level 3, a transmission from site 3A is received by a transceiver in link layer level 2, in this case site 2A. The message is retransmitted from site 2A to a transceiver located in link layer level 1 i.e., site 1A, which in turn transmits the message to the central transceiver 12. It will be appreciated that three separate transmissions or "hops" are required to transmit from transceiver site 3A in link layer level 3 to the central transceiver 12. The primary transmission paths are identified by the solid arrows 18 in FIG. 1.

If network and/or environmental conditions change, alternative transmission paths can be employed such as those shown by the dashed lines 20 in FIG. 1. Such changes can be caused by a variety of causes including equipment failures at a particular transceiver site, shifts in propagation paths produced terrain elements indicated generally as 22 in FIG. 1. For instance, if the transceiver 14 at site 2C in link layer level 2 goes down, sites 3C and 3D which used site 2C for their primary path transmission, can use the sites shown by the dashed lines in FIG. 1.

Figure 2:
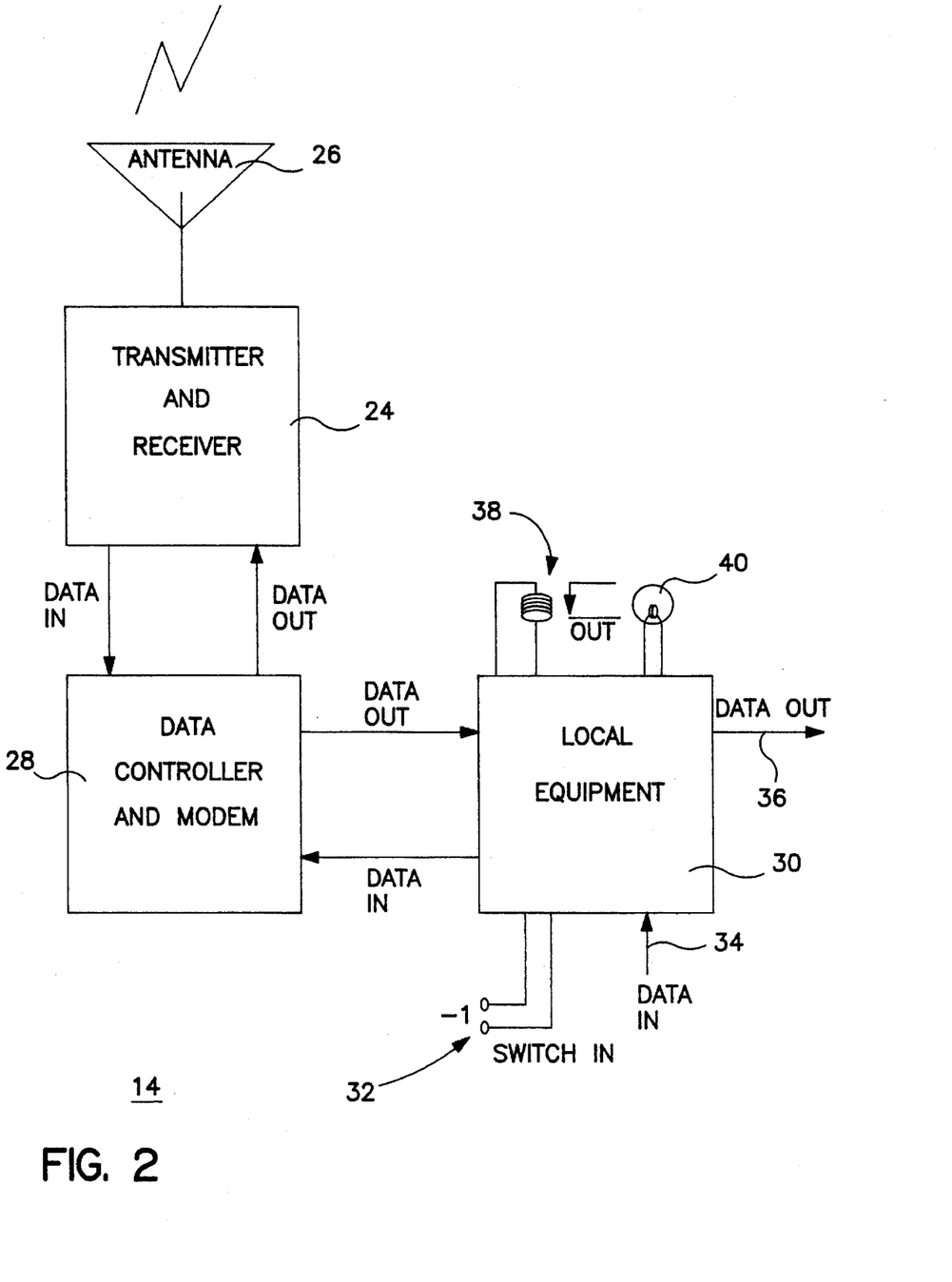
FIG. 2 is a block diagram of a remote transceiver.

Looking at FIG. 2, there is shown in block form a remote transceiver 14 which comprises a transmitter and receiver 24 that transmits and receives through antenna 26. Data from the receiver portion of transmitter and receiver 24 is sent to a data controller and modem 28 which outputs data to local equipment 30. The local equipment 30 provides for inputting information through a variety of input ports depicted illustratively as switch 32 and data line input 34. The local equipment provides output information in a variety of forms as shown by data output line 36 and illustratively by relay 38 and a visual indicator 40.

Figure 3:
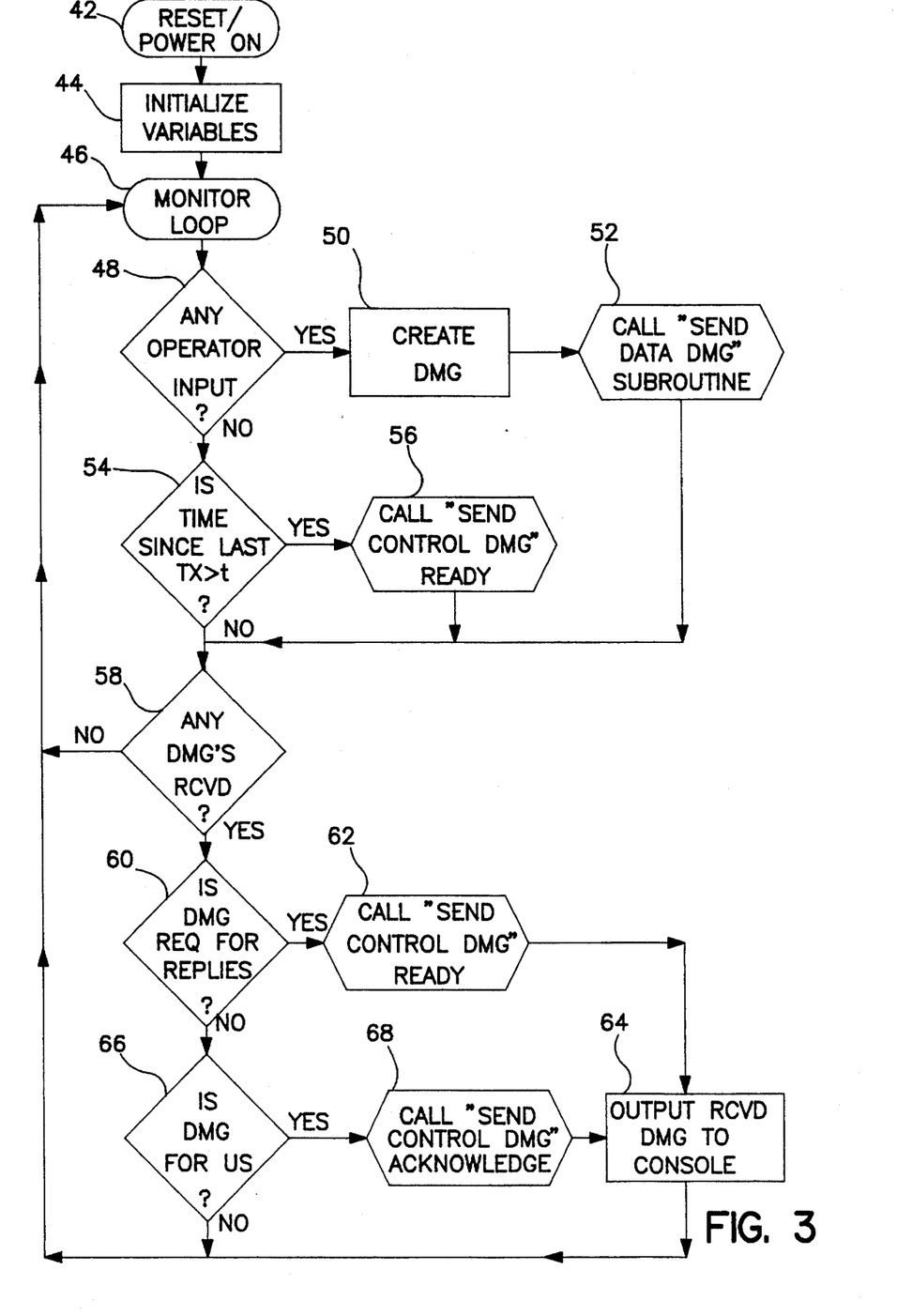
FIG. 3 is a flow diagram illustrating the operation of the central transceiver.
Figure 4:
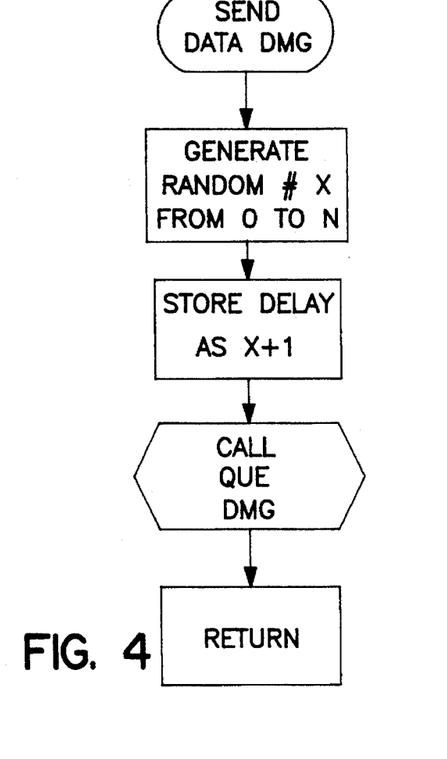
FIG. 4 is a flow diagram of the "send data message" subroutine.
Figure 5:
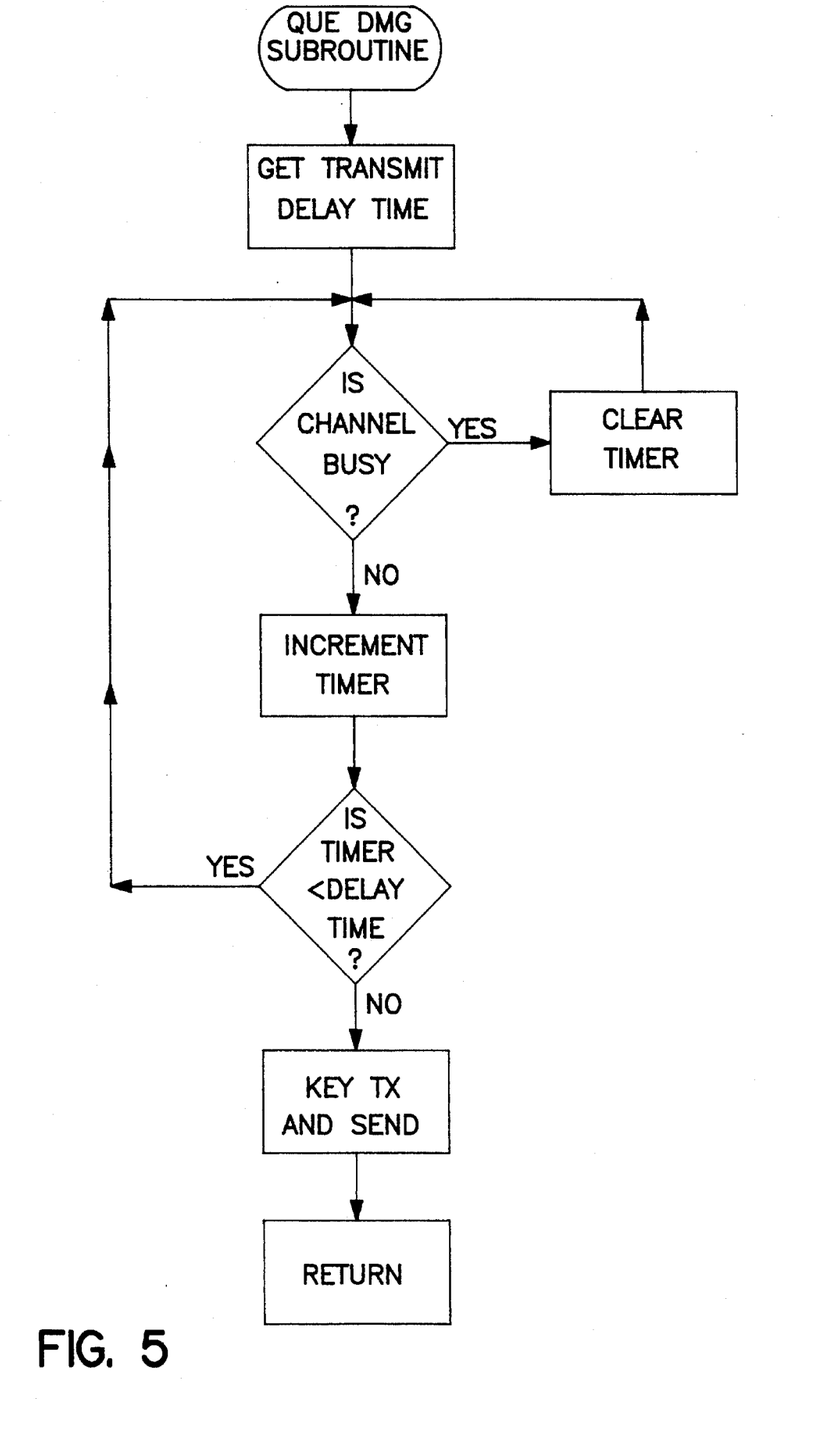
FIG. 5 is a flow diagram of the "que data message" subroutine.

Referring now to FIG. 3, there is shown a flow diagram for the destination or central station transceiver 12. Reset/Power-On is performed at 42 with a predefinition or initialization of variables at 44. The flow loop is monitored at 46 with decision box 48 determining whether or not there has been any operator input. For example, if there is operator input at the central station 12, a data message "DMG" is created at 50 with a call to "send data DMG" subroutine 52. The actual subroutine is shown in flow diagram form in FIG. 4 with the called "QUE DMG" subroutine therein shown in FIG. 5.

Figure 6:
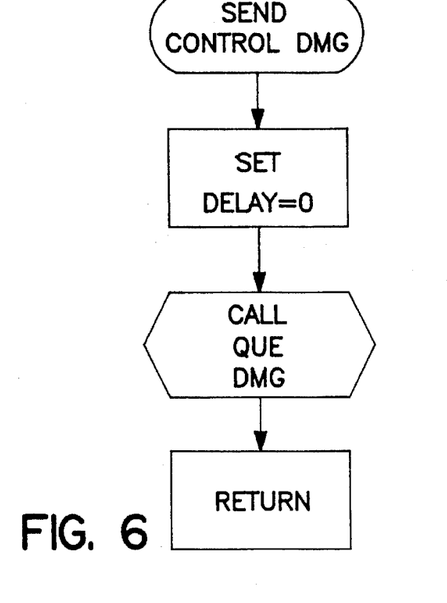
FIG. 6 is a flow diagram of the "send control data message" subroutine.

If there is no operator input at the central transceiver 12, the time from the last transmission is compared to a predetermined time t at 54. If the time is greater than t, the subroutine "send control DMG" ready is called at 56. The specific subroutine is shown in FIG. 6.

If any data messages, "DMG's" have been received at 58, decision, box 60 analyzes whether or not the "DMG" is a request for a reply from the destination transceiver such as central station transceiver 12. If there is a request for a reply, the "send control DMG" subroutine is called at 62. The output receive data message is forwarded at 64 to an operator console at the central station 12. If there is no request for replies, decision box 66 analyzes whether or not the data message is addressed to the central station transceiver. If so, the "send control DMG" subroutine is called at 68 again with the output received "DMG" forwarded to the central station console at 64.

Figure 7:
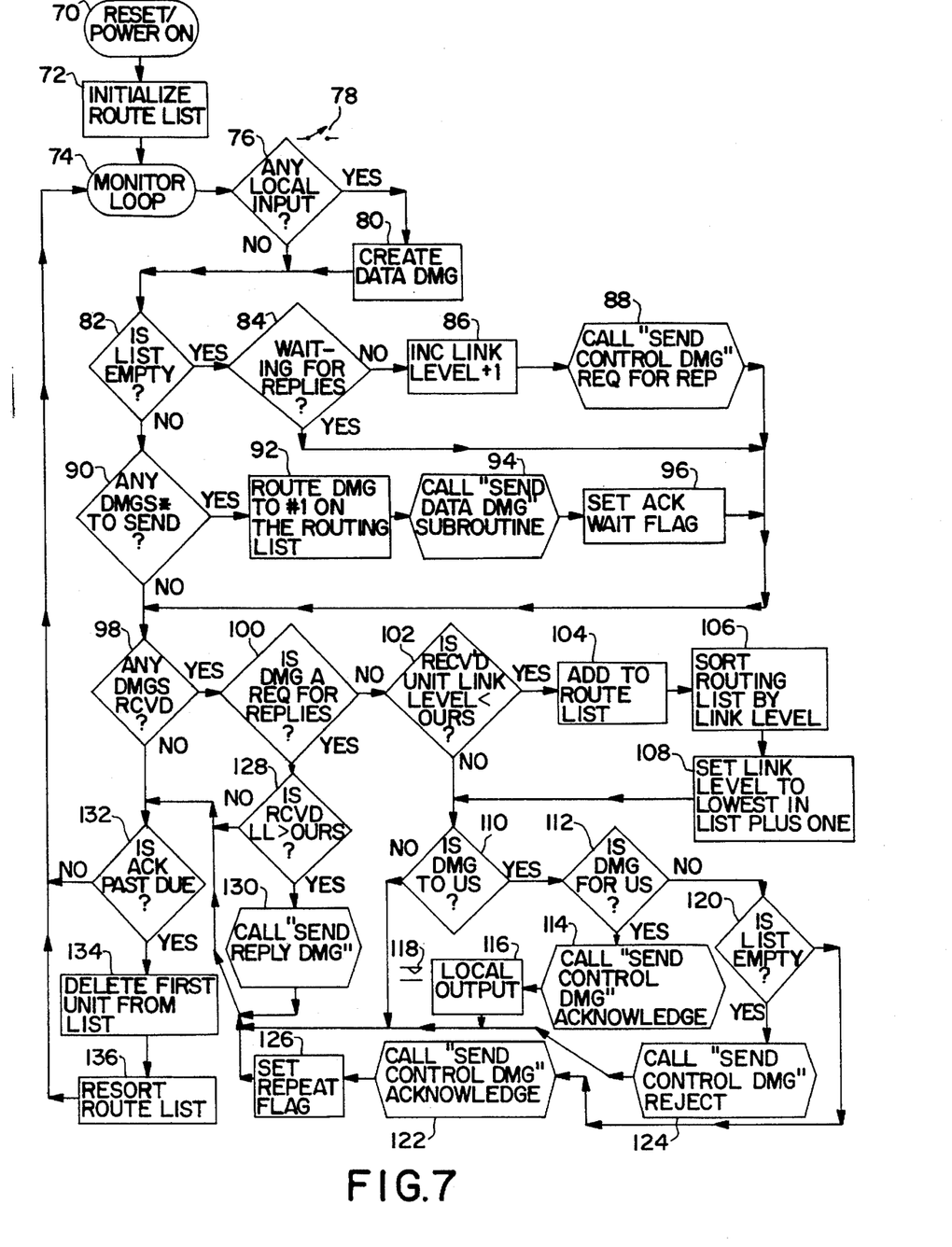
FIG. 7 is a flow diagram of the operation of a remote transceiver.

Turning now to FIG. 7, there is shown a flow diagram of the operation of a remote transceiver 14. The entry point for the flow diagram is Reset/Power-On 70. The routing is initialized at 72. The units of the link level variable are set to the maximum value to assume a worse case condition until it can be determined exactly where in the routing scheme the particular transceiver is located. The routing list is declared empty. Monitor loop 74 is the starting part of the monitoring loop. Decision box 76 determines whether there is any local input indicated illustratively by the switch 78. If there is any local input, a data message "DMG" containing the local input for transmission to the destination or central transceiver 12 is formatted 80. Decision box 82 determines whether the routing list is empty. If the list is empty, no Data Message Groups ("DMG's") can be repeated. A check is made at 84 to determine if the particular transceiver is waiting for replies from a previous REQuest for Replies. This check avoids continuous transmission. The stored, variable link layer level of the particular transceiver is incremented by one at 86. However, note that initially no replies have been received from any of the other transceiver units. Since replies will only be sent from a transceiver with a lower link level than the current link layer level of the particular transceiver, one can assume that the effective link level has increased because conditions no longer allow contact with the next lower level. To correct this, the link layer level of the transceiver is incremented by one. In the case of a transceiver that has just powered up, the link level is already at a predetermined numerical maximum and, therefore, is not increased.

After incrementing the link layer level by one, another attempt is made to transmit a request for replies with the then current link level through calling the "send control DMG" subroutine 88.

Decision box 90 checks to see if any "DMG's" have been received that require the transceiver to retransmit the "DMG's". Note that this flag can be set by block 126. If there are any "DMG's" to be sent, the "DMG's" are retransmitted to the number one transceiver on the routing list 92 since that transceiver represents the then shortest known path to the central transceiver 12. The "send data DMG" subroutine is called at 94. The ACKnowledgement Wait flag is set at 96. This flag tests for confirmation of the reception of the "DMG" at the transmitter to which the message has just been sent. If after a certain delay the ACK has not been received, it is assumed that the transmission was unsuccessful. If desired, multiple re-transmissions can be allowed before declaration of a failure to communicate to the desired transceiver.

Decision box 98 checks to determine if the receiver flag has been set for any new "DMG's". The "DMG" is analyzed at 100 to determine if it is a request for replies. If the received "DMG" is not a request for replies and the current stored, variable link level of the transceiver is less than the link level of the transceiver that transmitted the "DMG" as analyzed at 102, the station ID of the transmitting transceiver is added to the route list at 104. Since the transmitting transceiver link level is lower than the receiving transceiver link level, the transmitting transceiver is located closer to the central site than the receiving transceiver. Thus, it should be added to the routing list. This is the process that creates the routing list. The routing list is sorted by link level at 106. The sorting order is in ascending relation so that the top of the routing list contains the remote transceiver with the lowest link level i.e., the one located closest to the central transceiver 12. This sorting arrangement insures that the more preferable transceivers are listed first. It should be noted that the routing list can be further sorted by secondary criteria such as, receive signal strength, reliability and type of equipment. After sorting the routing list at 106, the transceiver's link level is set 108 to be equal to one greater than the transceiver with the lowest link level that can communicate with the present transceiver.

The data message is checked 110 as to whether or not it is addressed "to us" if not it is ignored It should be understood that "to us" does not mean "for us". In other words, this particular transceiver may not be the ultimate destination of the message. The "DMG" is also checked at 112 to determine if this particular transceiver is the ultimate destination of the "DMG". If this particular transceiver is the ultimate destination, the "send control DMG" ACKnowledge subroutine is called at 114. If this particular transceiver is the ultimate destination, then appropriate local action is taken at 116 and indicated illustratively by the relay contacts 118.

If the particular transceiver is not the ultimate destination, the routing list is checked to determine if the list is empty at 120. Since the routing list is empty, the particular transceiver cannot retransmit the "DMG". The "send control DMG" reject subroutine is called at 124 to inform the message transmitting transceiver that it will have to seek an alternate route to the destination transceiver.

If the routing list is not empty, the "send control DMG" subroutine is called at 122 to ACKnowledge receipt of the message. Since the message was sent to the particular transceiver, but was destined for a different transceiver, the message must be relayed through the transceiver's routing list. The set repeat flag is set at 126 and the condition of this flag is monitored through decision box 90.

Figure 8:
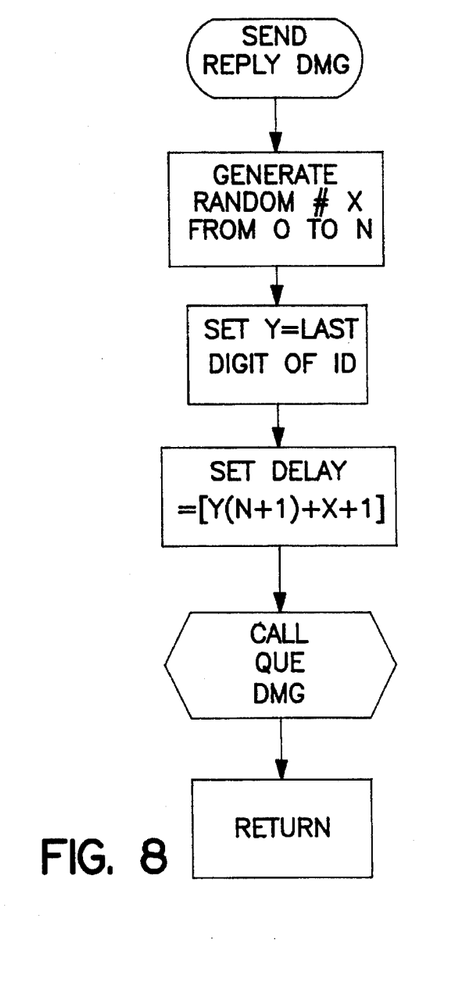
FIG. 8 is a flow diagram of the "send reply data message" subroutine.

If the DMG is a request for replies 100 and the link level of the transceiver transmitting the received message is greater than the link level of the present transceiver as checked at 128, the "send reply DMG" subroutine of FIG. 8 is called at 130. It should be noted that the transceiver receiving this reply "DMG" can then add the present transceiver to its routing list.

If the ACKnowledgement is not past due as checked at 132, no action has to be taken by the present transceiver. However, if it is overdue and all retries allowed have failed, then the transceiver to which the "DMG" was sent is assumed to be out of communication and is deleted from the routing list at 134 and the list is resorted at 136.

Having described in detail a preferred embodiment of our invention, it will now be obvious to those skilled in the art that numerous modifications can be made therein without departing from the scope of the invention as defined in the following claims. For example, although the link layer levels have been described as numerical levels, other sequences can be employed such as, alphabetical or otherwise, as long as a predetermined hierarchy is established.

What we claim and desire to secure by Letters Patent in the United States is:

1. A method for dynamically configuring a wireless communications network between and among a plurality of transceivers each having a unique, permanent identification and a variable, stored numerical link layer level, said method comprising the steps of:

(1) designating one of said transceivers as a central transceiver and assigning it a predetermined numerical link layer level n, and assigning to all other transceivers a maximal link layer level:

(2) transmitting a message from the central transceiver that includes its own unique, permanent identification and its link layer level;

(3) to each of said other transceivers that received the message from the central transceiver reassign a link layer level by incrementing by 1 the said link layer level included in the said received message, said reassigned link layer level being stored at each of said other transceivers;

(4) transmitting a status message from each such other transceiver reassigned a link layer level in Step 3, said status message being transmitted after the occurrence of a variable transmission delay for each such other transceiver and including each such other transceiver's own unique, permanent identification and its link layer level assigned and stored in Step 3;

(5) to each such other transceivers that received the status message transmitted in the prior Step, and has not yet been reassigned a link layer level, reassign a link layer level by incrementing by 1 the said link layer level included in the said received message, the so reassigned link layer level being stored at each such other transceiver;

(6) transmitting a new status message from each transceiver reassigned a link layer level in the prior Step, said new status message being transmitted after a variable transmission delay and including each such other transceiver's own unique, permanent identification and its link layer level assigned and stored in the prior Step;

(7) repeating Steps 5 and 6 until all of the other transceivers have been reassigned a link layer level.

2. The method of claim 1 further comprising the step of repeating steps (2) through (7) for at least some of the transceivers in said plurality of transceivers in response to a change in said wireless communications network, if change affects, either the then stored routing list or the stored link layer level of a remote transceiver.

3. The method of claim 1 further comprising the step of repeating steps (2) through (7) for at least some of the transceivers in said plurality of transceivers when the number of transceivers in said plurality of transceivers change.

4. The method of claim 1 further comprising the step of generating at each transceiver a list of the unique, permanent identifications of all transceivers from which a message was received.

5. The method of claim 1 further comprising the step of repeating steps (2) through (7) for at least some of the transceivers in said plurality of transceivers.

6. The method of claim 1 further comprising the step of repeating steps (2) through (7) for at least some of the transceivers in said plurality of transceivers at time intervals that are not longer than a predetermined time interval t.

7. A method for communicating over a wireless communication network comprising a central transceiver having a unique, permanent identification with a predetermined numerical link layer level n and a plurality of remote transceivers each having a unique, permanent identification and a variable, stored numerical link layer level x, where $x > n$ and x and n are integers and $x-n-1$ represents the number of remote transceivers through which a message must pass to reach the central transceiver, and each remote transceiver, such method comprising the steps of:

(1) transmitting a message from one of said remote transceivers having a stored numeric link layer level x, said message being addressed to the central transceiver if $x = n+1$, or to another remote transceiver having a link layer level $x-1$, if $x > n+1$, said message constituting the unique permanent identification of the transmitting transceiver, its currently stored link layer level x, the unique permanent identification of the transceiver to which the message is addressed, and a content portion;

(2) receiving said message at the addressed transceiver;

(3) retransmitting the message received in Step 2 if the addressed transceiver is other than the central transceiver, but with said message addressed to a different transceiver having a link layer level less than that of the retransmitting transceiver and said retransmitted message including the unique permanent identification and the currently stored link layer level of the retransmitting transceiver; and, (4) repeating Steps 2 and 3 until the message is received by said central transceiver.

8. A wireless communication network comprising:

(A) a central transceiver having a unique, permanent identification with a predetermined numerical layer level n;

(B) a plurality of remote transceivers each having a unique, permanent identification and a variable, stored numerical link layer level x, where $x > n$ and x and n are integers and $x-n-1$ represents the number of remote transceivers through which a must be retransmitted to reach the central transceiver;

(C) means for transmitting a message from one of said remote transceivers having a stored numeric link layer level x, said message being addressed to the central transceiver if $x = n+1$, or to another remote transceiver having a link layer level less than or equal to $x-1$, if $x > n+1$, said message constituting the unique permanent identification of the transmitting transceiver, its currently stored link layer level x, the unique permanent identification number of the central transceiver to which the message is addressed, and a content portion;

(D) means for receiving said message at the addressed transceiver; and, (E) means for retransmitting the received message, if the addressed transceiver is other than the central transceiver, to a different transceiver having a link layer level less than that of the retransmitting addressed transceiver and said retransmitted message including the unique permanent identification and the currently stored link layer level of the retransmitting transceiver.

9. The wireless communication network of claim 8 further comprising means for changing the stored, variable link layer level x of an addressed transceiver in response to a change in the link layer level of a transceiver having a lower link layer level than said addressed transceiver and whose message has been received by said addressed transceiver.

10. The wireless communication network of claim 8 further comprising means for establishing a routing list of transceivers with which said one of said remote transceivers can communicate.

11. The wireless communication network of claim 10 further comprising means for sorting the routing list.

12. The wireless communication network of claim 11 wherein said routing list is sorted in ascending order by link layer level with the lowest link layer level at the top of the routing list.

13. The wireless communication network of claim 10 further comprising means for ordering the routing list at each remote transceiver in an order determined by the minimum of transceivers required to send a message from said remote transceiver to the central transceiver.

14. The wireless communication network of claim 9 wherein the stored, variable link layer level x is changed in response to a change in said wireless communication network, if said change affects, either the then stored routing list or the stored link layer level of a remote transceiver.

15. The wireless communication network of claim 9 wherein the stored, variable link layer level x is changed when the number of transceivers in said plurality of transceivers changes.

16. The wireless communication network of claim 9 wherein the stored, variable link layer level x is changed at time intervals that are not longer than a predetermined interval t.

17. A method for dynamically reconfiguring with or without operator intervention, transmission paths in a wireless communication network between a plurality of remote transceivers and a central transceiver comprising the steps of:

(A) Assigning to each remote transceiver a variable link layer level, x, and another permanent identification, and assigning to the central transceiver a fixed link layer level, 0, said link layer level x, being the minimum number of transmissions required to retransmit a message to reach said central transceiver, (B) Providing each remote transceiver with means to determine its own link layer level, x, and create its own prioritized routing list that are both updated during every message reception by said remote transceiver, from data attached to such received messages, and;

(C) At any time, routing communications between the said central transceiver and any remote transceiver having a link layer order x, through x−1 transceivers having a descending link layer level, when sending a message to the central transceiver, and having an ascending link layer level when messages are sent in the reverse direction.

18. A method of claim 17 whereby the means for determining a remote transceiver's link layer level and create its own routing list include:

(A) a data controller at each transceiver to format messages for transmission, and to include in each transmitted message the transceiver's permanent identification and the link layer level of said transceiver at the time of the transmission;

(B) means to monitor the loop for other transceivers transmitted messages and acknowledgments and to transmit messages and acknowledgments;

(C) said data controller having embedded in it a software algorithm determining link layer level hierarchy in the system, and an updatable message priority routing list, by:

(i) comparing the link layer level of other transmitting transceivers whose messages have been received to its then current link layer level; and, (ii) adding to its routing list any such transmitting transceiver having a link layer level lower than its own link layer level; and, (iii) sorting the routing list by link layer level so that the top of the list includes the lowest link layer level of such other transmitting transceiver; and, (iv) resetting its own link layer level to be the lowest link layer level on the routing list plus one; and, (v) in the event that the routing list is empty, increment its own link layer level by one, then transmit a message, and repeat steps i to iv; and, (vi) in the event that an acknowledgment of message receipt is past due from a transmitting transceiver at the top of its routing list, delete said transmitting transceiver from the routing list, then repeat steps i to iv or step v.

19. A dynamically self reconfiguring wireless communication network comprising:

(A) a central transceiver having a unique permanent identification and a link layer level 0;

(B) a plurality of remote transceivers each having a unique, permanent identification and a variable link layer level, x, said link layer level x, being the minimum number of transmissions required to retransmit a message to reach said central transceiver; and, (C) data control and processing means at each remote transceiver to determine each transceiver's own link layer level, x, and update at each transceiver a prioritized routing list.

20. A self reconfiguring wireless communication network as in claim 19, whereby each remote transceiver's routing list and link layer level are updated upon each transmission received by said remote transceiver.

* * * * *